United States Patent

Wei et al.

[11] 3,894,003
[45] July 8, 1975

[54] 4-BIPHENYLCARBONYLACYLAMIDO PENICILLANIC ACID AND SALTS

[75] Inventors: Peter H. L. Wei, Springfield; Ronald J. McCaully, Malvern, both of Pa.

[73] Assignee: American Home Products Corporation, New York, N.Y.

[22] Filed: Mar. 18, 1974

[21] Appl. No.: 452,016

[52] U.S. Cl. ............................ 260/239.1; 424/271
[51] Int. Cl.² .................................. C07D 499/44
[58] Field of Search .......................... 260/239.1

[56] References Cited
UNITED STATES PATENTS
3,360,527 12/1967 Naito et al. ............... 260/239.1 X FOREIGN PATENTS OR APPLICATIONS
877,531 9/1961 United Kingdom ............. 260/239.1

Primary Examiner—Gerald A. Schwartz
Attorney, Agent, or Firm—Richard K. Jackson

[57] ABSTRACT

The invention provides anti-bacterial agents of the formula:

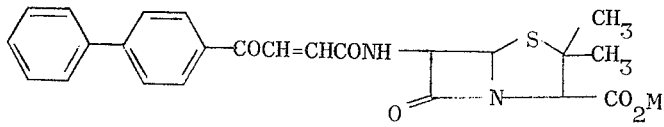

in which M is a member selected from the group consisting of —H, an alkali metal and —NH₄.

2 Claims, No Drawings

4-BIPHENYLCARBONYLACYLAMIDO PENICILLANIC ACID AND SALTS

Alpha, beta-unsaturated amides of 6-aminopenicillanic acid are disclosed in British Pat. No. 877,531.

DESCRIPTION OF THE INVENTION

In accordance with this invention there is provided a group of anti-bacterial agents which are 6-[3-(4-biphenylyl-carbonyl)acrylamido] penicillanic acid, the alkali metal and ammonium salts.

The compounds of the invention are prepared by coupling 4-biphenylylcarbonylacrylic acid with 6-aminopenicillanic acid or a salt thereof by the mixed anhydride or dehydrative coupling method as it is conventionally employed in polypeptide synthesis. Alternatively, the 4-biphenylylcarbonylacrylic acid halide may be produced by conventional techniques and reacted with 6-aminopenicillanic acid or salt in the presence of an acid acceptor.

The anti-bacterial agents of this invention are noteworthy for their activity against penicillin resistant staphlococcus strains CHP and 53-180, although they are also effective inhibitors for use in control of gram-positive and gram-negative bacterium. The activity of the compounds was established in accordance with the well known, scientifically accepted agar serial dilution method for testing anti-bacterial agents. The compounds of the invention, having been proven effective antibacterial agents, are useful in the treatment of bacterial infections amenable to penicillin treatment. In addition, the anti-bacterial agents of this invention are useful in the fields of comparative pharmacology and in microbiology for the control and comparative analysis of bacterial colonies.

The following example illustrates the preparation of the free penicillanic acid, from which the sodium, potassium and ammonium salts are produced by conventional means, as by reaction with potassium or sodium 2-ethylhexanoate or ammonium hydroxide. The activity of the free acid against specific bacterial strains is provided for those bacterium completely controlled at a concentration of 250 micrograms per milliliter and below. The product of the example is active at higher concentrations against other bacterium.

EXAMPLE I

6-[3-(4-Biphenylylcarbonyl) acrylamido] penicillanic acid.

To a tetrahydrofuran solution containing 3-(4-biphenylylcarbonyl)acrylic acid in a salt-ice bath is added triethylamine (0.50 g.), followed by an equimolar amount of isobutyl chloroformate. After the solution is stirred for 15 minutes, a cold solution of aqueous tetrahydrofuran containing an equimolar amount of 6-aminopenicillanic acid and 0.50 gram of triethylamine, is added. The mixture is stirred in the ice bath for 1 hour and at room temperature for an additional hour. A small amount of solid material is removed by filtration and the filtrate is evaporated under reduced pressure at approximately 30°C. The residue is suspended in 50 milliliters $H_2O$, filtered and the filtrate is acidified with 6N HCl. The resulting precipitate is washed with water, dissolved in ethyl acetate and dried over anhydrous $MgSO_4$. The solvent is removed and the residue is washed with pentane and collected as the title compound.

Elemental Analysis: $C_{24}H_{22}N_2O_5S \cdot H_2O$.
Calcd: C, 61.53; H, 5.16; N, 5.98.
Found: C, 61.05; H, 4.99; N, 6.31.

| | | |
|---|---|---|
| Bacillus subtilis | 6633 | 7.81 |
| Herellea species | 9955 | 125 |
| Neisseria catarrhalis | 8193 | 15.6 |
| Staphylococcus aureus | 6538P | .976 |
| Staphylococcus aureus | SMITH | .976 |
| Staphylococcus aureus | CHP | 31.3 |
| Staphylococcus aureus | 53-180 | 31.3 |

What is claimed is:

1. A compound of the formula:

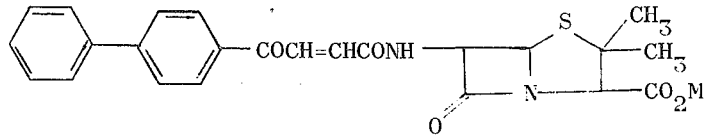

in which M is a member selected from the group consisting of -H, an alkali metal and $-NH_4$.

2. The compound of claim 1 which is 6-[3-(4-biphenylylcarbonyl)acrylamido]penicillanic acid.

* * * * *